United States Patent
McEvoy

(10) Patent No.: US 7,353,089 B1
(45) Date of Patent: Apr. 1, 2008

(54) METHOD AND SYSTEM FOR A SIGNAL GUIDED MOTORIZED VEHICLE

(75) Inventor: Paul E. McEvoy, Owensville, OH (US)

(73) Assignee: P.E.M. Technologies, LLC, Cwensville, OH (US)

( * ) Notice: Subject to any disclaimer, the term of this patent is extended or adjusted under 35 U.S.C. 154(b) by 121 days.

(21) Appl. No.: 11/101,779

(22) Filed: Apr. 8, 2005

Related U.S. Application Data

(60) Provisional application No. 60/561,837, filed on Apr. 13, 2004.

(51) Int. Cl.
*G08G 1/123* (2006.01)

(52) U.S. Cl. .......................................... 701/2; 180/167

(58) Field of Classification Search ................ 701/2, 701/215, 300, 301, 302; 455/41.1; 180/167, 180/169, 170; 318/16, 587
See application file for complete search history.

(56) References Cited

U.S. PATENT DOCUMENTS

| | | | | |
|---|---|---|---|---|
| 3,742,507 A | * | 6/1973 | Pirre | 180/167 |
| 3,812,929 A | * | 5/1974 | Farque | 180/167 |
| 3,856,104 A | * | 12/1974 | Ohba | 180/167 |
| 4,137,984 A | | 2/1979 | Jennings et al. | |
| 4,249,176 A | * | 2/1981 | Oishi et al. | 342/42 |
| 4,751,689 A | * | 6/1988 | Kobayashi | 367/127 |
| 4,878,554 A | | 11/1989 | Dion | |
| 5,053,768 A | * | 10/1991 | Dix, Jr. | 340/988 |
| 5,064,012 A | | 11/1991 | Losego | |
| 5,295,551 A | * | 3/1994 | Sukonick | 180/167 |
| 6,263,279 B1 | * | 7/2001 | Bianco et al. | 701/213 |
| 6,525,510 B1 | | 2/2003 | Ayano et al. | |

\* cited by examiner

*Primary Examiner*—Dalena Tran
(74) *Attorney, Agent, or Firm*—Wood, Herron & Evans, LLP

(57) ABSTRACT

A motorized cart that supports one or more golf bags automatically follows a golfer around the golf course from hole to hole. In particular, the golfer wears, or carries, a signal transmitter that emits a signal that is received by the motorized cart and then used by the motorized cart to stay within a predetermined range of the golfer. In addition to golfers, delivery personnel and other users may also benefit from this cart.

18 Claims, 3 Drawing Sheets

METHOD AND SYSTEM FOR A SIGNAL GUIDED MOTORIZED VEHICLE

This claims the benefit of U.S. Provisional Patent Application Ser. No. 60/561,837, filed Apr. 13, 2004 and is hereby incorporated by reference entirely.

BACKGROUND OF THE INVENTION

The present invention relates to a driverless motorized vehicle and, more particularly, to such a vehicle that is guided by radio waves.

Golfing is an activity that many different people can enjoy. The health conditions of these different individuals can dramatically vary as well. As is commonly known, a golf course has a number of different holes that have varying lengths between a tee and a cup. These varying lengths range from approximately 150 yards to over 500 yards. Accordingly, a golfer covers a large distance in the course of playing eighteen holes of golf, or even nine holes of golf. In addition, the golfer (without a caddy) will also have to transport a bag of golf clubs while traveling around the golf course.

A number of different modes of transportation exist for golfers to travel over the different holes while playing a round of golf. The simplest mode of travel is for a golfer to walk the course while carrying his golf bag. This mode of travel requires a relatively healthy individual with certain levels of stamina and strength. The physical burden of walking great distances with a heavy golf bag is likely to considerably tire a golfer and, in many instances, make a golf outing an unpleasant experience.

A motorized cart is one mode of travel at the other end of the spectrum. Using the cart, a golfer can ride around the golf course without exertion because the cart carries the golfer as well the golf clubs. While this mode requires little physical exertion, some golfers dislike using a cart because it eliminates the health benefits of leisurely walking, which is one aspect that some golfers enjoy about playing golf.

Another mode of travel is a pull cart that carries a golf bag and is hauled behind a golfer while that golfer walks around the golf course. This mode of travel still allows the golfer to walk while playing golf but eliminates the need to carry the entire weight of the golf clubs while walking. However, pull carts are sometimes awkward to use, difficult to maneuver, and still require more physical exertion than simply walking.

Thus, there is a need, unmet in the prior art, of a way for golfers to enjoy the beneficial effects of walking and exercise while playing golf, but that eliminates the extra burden of carrying or pulling golf bags and golf clubs while walking.

SUMMARY OF THE INVENTION

Accordingly, aspects of this present invention relate to a motorized cart that supports one or more golf bags and automatically follows a golfer around the golf course from hole to hole. In particular, the golfer wears, or carries, a signal transmitter that emits a signal that is received by the motorized cart and then used by the motorized cart to stay within a predetermined range of the golfer.

It will be appreciated that the foregoing aspects of the invention are applicable to various types of motorized carts. These various aspects are also applicable to various components of such systems which would benefit from the features described herein. These and other features, objects and advantages of the invention will become more readily apparent to those of ordinary skill in the art upon review of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to illustrate various embodiments of the invention.

DETAILED DESCRIPTION

While the present invention is described herein within the specific environment of a motorized golf cart, embodiments of the present invention are beneficial and useful within other environments as well. For example, a mail or package delivery person could use a motorized cart to help deliver packages and other parcels while walking a delivery route. Also, a stock clerk or inventory personnel could utilize such a motorized cart for retrieving or restocking inventory in a warehouse or other setting. Thus, the present invention is not limited to simply carrying golf clubs on a golf course but, instead, contemplates use within a variety of different environments in which people walk and are responsible for carrying one or more items.

Figure 1:
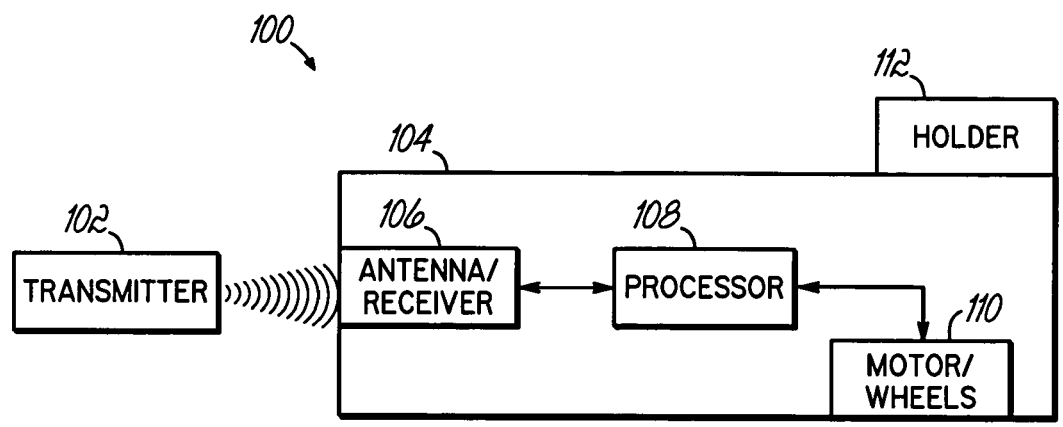
FIG. 1 depicts a schematic view of a motorized cart system in accordance with the principles of the present invention.

FIG. 1 is a schematic view of a motorized cart system 100 in accordance with the principles of the present invention. While the term "cart" is used herein, it should be understood that this invention is applicable with any wheeled vehicle. The elements of the motorized cart system 100 are shown as functional boxes in FIG. 1. Later figures provide additional detail regarding these functional boxes. A transmitter 102 is used to transmit a signal that is used by a cart 104 to locate the relative position of the transmitter 102 from the cart 104. The transmitter 102 is advantageously small enough to be comfortably carried or worn by a person, such as a golfer. For example, the transmitter 102 may include a belt clip that attaches to a pocket or belt of a golfer. Additionally, the transmitter may also be implemented in less-obtrusive forms such as a wrist-watch or possibly a hat or hat band. One of ordinary skill will recognize that the transmitter 102 may be implemented in a variety of functionally equivalent ways without departing from the scope of the present invention. One advantageous transmitter 102 is a belt-clip device. Such a transmitter 102 balances the cost of manufacturing, the size and weight of the transmitter, and the availability of economic batteries or other power sources.

A number of different types of signals may be emitted by the transmitter 102 that would allow a cart 104 to home in on the transmitter 102. Thus, embodiments of the present invention contemplate that a variety of wireless transmission frequencies would allow the cart 104 to track the location of the transmitter 102. One advantageous frequency range, however, is the radio frequency range of approximately 300 KHz to 400 KHz. In the United States, this range of the spectrum has been set aside for directional radio systems and is particularly useful for embodiments of the present invention.

The cart 104 includes an antenna/receiver 106 that detects and receives the signals emitted from the transmitter 102. Conventional antennas and receivers, as would be known to one of ordinary skill, can be used to acquire the signals emitted from the transmitter 102. The received signals are then fed to a processor, or control, system 108 for additional analysis. At the processor system 108, the received signals are used to determine a relative distance and direction of the transmitter 102. With this information, the processor can generate control signals for the cart 104.

In particular, control signals are generated by the processor system 108 for controlling the motors and wheels 110 of the cart 104. These control signals adjust the speed and direction of the cart 104 so that the cart 104 maintains a predetermined distance from the transmitter 102. The cart 104 also includes a holder 112, or rack. This holder 112, may, for example, securely hold one or more golf bags. In other environments, the holder 112 may be configured to accommodate boxes, racks or other type of item-holders.

Accordingly, as a golfer walks around a golf course while playing a round of golf, the cart automatically follows the golfer around and carries the golf bags and possibly other items such as a drink cooler, refreshments or other accessories. Thus, the golfer enjoys the benefits of walking while playing golf, but is not burdened by carrying heavy items.

Typically, golfers play in groups of four and, therefore, there may be four different motorized carts 104 and transmitters 102 in close proximity to one another (if the cart 104 only holds one golf bag). Thus, the present invention contemplates using channels within the applicable spectrum range so that a transmitter 102 and a cart 104 can be paired together and not interfere with another, nearby cart and transmitter. For example, the spectrum range of 300 KHz –400 KHz mentioned earlier could be equally divided into four separate 25 KHz channels. In such an environment, the transmitter 102 and the cart 104 would include a switch (not shown) that allows selection of an operating channel.

In operation, a golfer wearing a transmitter 102 would approach a cart 104 and then turn on the transmitter 102. The cart 104 detects the signal from the energized transmitter 102 and turns on power to its drive motors. As the golfer moves from the cart and out on the golf course, the cart 104 determines the left/right and front/back position of the transmitter 102 and drives the motors accordingly. If communications are interrupted between the cart 104 and the transmitter 102 for any reason, the transmitter 102 can be powered on and off to reset its communications with the cart 104. Alternatively, the cart 104 can be powered on and off to reset communications as well.

Figure 2:
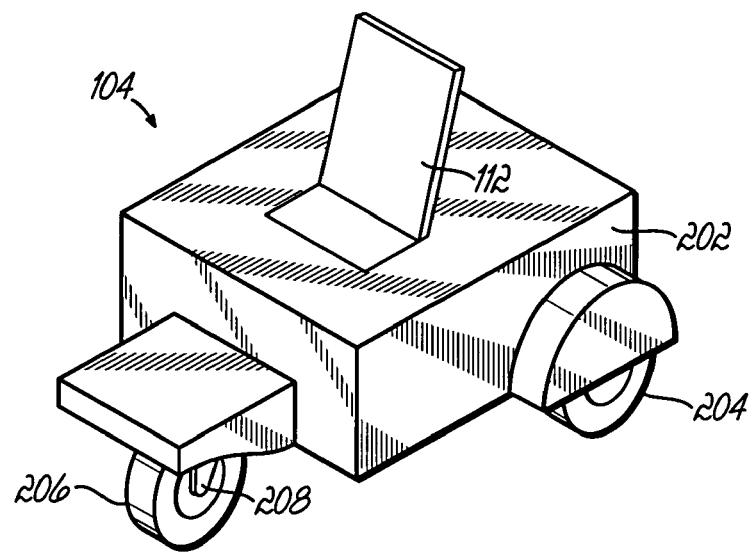
FIG. 2 illustrates a perspective view of the exterior of a motorized cart in accordance with the principles of the present invention.

FIG. 2 depicts an exemplary cart 104 in accordance with the principles of the present invention. The size and shape of the cart 104 can be varied, without departing from the scope of the present invention, to accommodate a specific intended purpose or environment for the cart 104. For example, on a golf course, advantageous dimension for the cart 104 would be a height of around 14 inches, a length of around 54 inches and a width of approximately 24 inches (main body) or 34 inches wide (fender-to-fender). A cart with these dimension will have the stability and size to successfully handle the terrain typically encountered on a golf course.

Similarly, the size and power of the motors and wheels 204, 206 can be varied to accommodate different applications without departing from the scope of the present invention. Conventional golf carts include wheels driven by electric motors that are powered from readily available 12V batteries. Accordingly, embodiments of the present invention use conventional 12V drive boxes such as those distributed by Essex Manufacturing for conventional golf carts. The use of two such drive boxes results in a cart 104 that is able to transport about 350 pounds up a 2:1 slope.

The front wheel 206 is not necessarily a drive wheel and is coupled to the body 202 so that it freely pivots to direct the cart 104 to the left or to the right. More particularly, the front wheel 206 connects with a frame (not shown) through a bearing assembly 208. This bearing assembly absorbs the forces that are generated when the cart 104 accelerates or decelerates. One advantageous material for this bearing is an ultra-high molecular weight polyethylene. One advantageous material for the frame is aluminum or a similar, non-reactive material.

The body 202 of the cart 104 houses circuitry and the drive motors that are connected to the frame and protects them from damage. The material for the body 202 is selected so as not to interfere with the reception of signals from the transmitter 102 and is preferably fiberglass or a similar low-maintenance material. The shape of the body 202 is exemplary in nature and other shapes and exterior features, forms, and styles are contemplated within the scope of the present invention.

Figure 3:
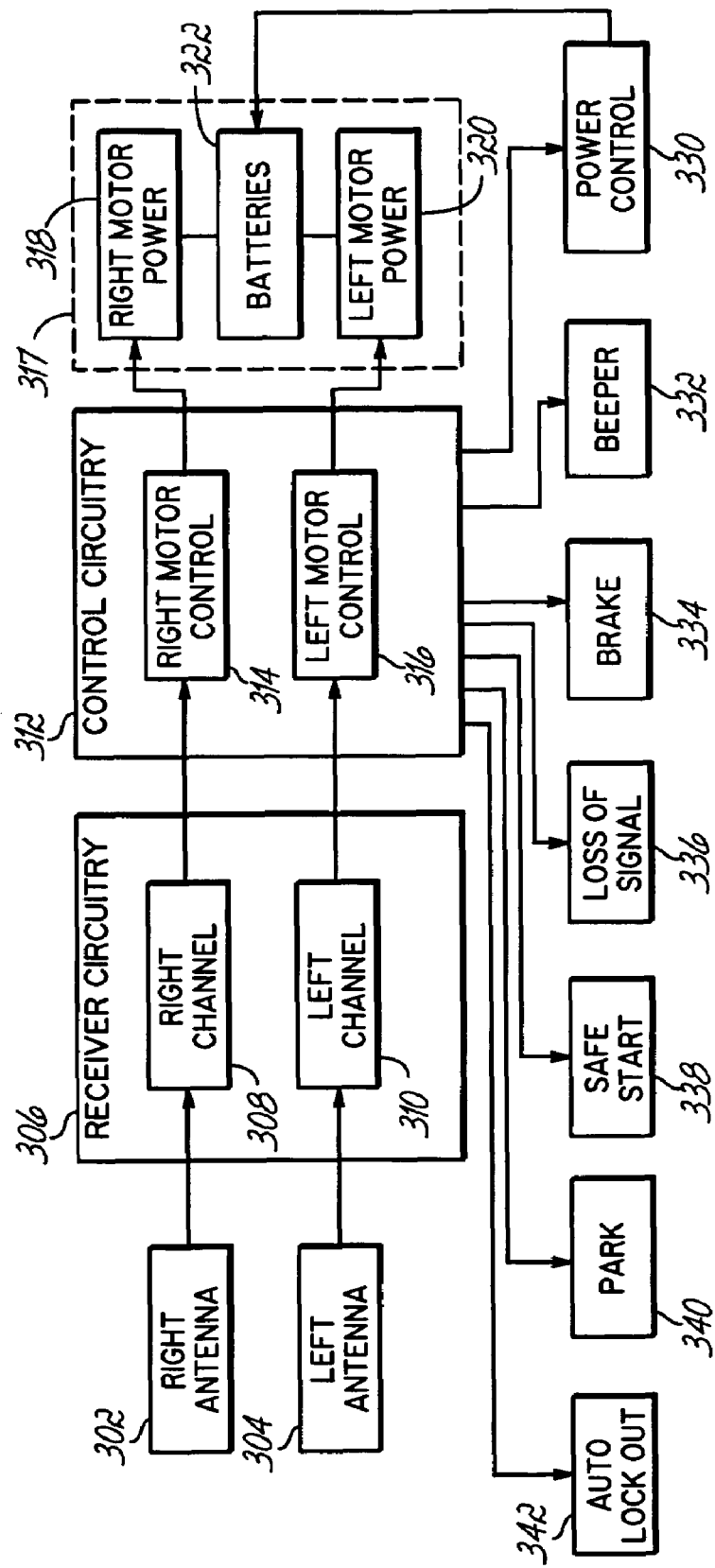
FIG. 3 illustrates a schematic view of the functional elements of a motorized cart in accordance with the principles of the present invention.

FIG. 3 is a more detailed view of the functional blocks located within the cart 104. Attached as additional figures are detailed circuit schematics that implement one exemplary embodiment of the present invention. However, the functionality of the circuits described in those schematics can be implemented in alternative ways without departing from the scope of the present invention. Therefore, FIG. 3 depicts functional elements of the cart 104 without requiring any specific circuitry for implementing such functionality.

One antenna, a right antenna 302 is located on one side of the cart 104 and another antenna, the left antenna 304, is located on the other side of the cart 104. The body and frame size described above, allows these two antennas 302, 304 to be spaced approximately 24 inches apart. Each antenna 302, 304 is tuned to receive a signal transmitted by the transmitter 104.

Within the cart 104, there is a receiver circuit board 306 that includes a right receiver channel 308 and a left receiver channel 310. The right receiver channel 308 receives a signal from the right antenna 302 and the left receiver channel 310 receives a signal from the left antenna 304. In a particular embodiment of the present invention, each receive includes a demodulator circuit that senses whether the received signal is pulsed or modulated. According to this embodiment, the transmitter 102 is configured to transmit its signal in a modulated manner that the cart 104 can detect. If the received signal is not modulated, then the cart 104 will not turn on even though it receives an RF signal within its range. Similarly, if the signal strength at the channels 308, 310 is not above a particular threshold, then the cart 104 does not turn on either. By these means, it is unlikely that an unintentional RF radiator will inadvertently power on the cart 104.

The signals from the channels 308, 310 are fed into the control circuit board where they are used to determine the front/back relationship and the right/left relationship of the location of the transmitter 102 with the location of the cart 104. From these signals, motor control circuitry 314 generates a voltage signal for the right drive motor 318 and control circuitry 316 independently generates a voltage signal for the left drive motor 320.

These separate voltage signals are forwarded to a power board 317 that applies power from the battery to each drive motor 318, 320 in proportion to the voltage signal from the control board 312. In response, each drive motor 318, 320 operates in an appropriate speed and direction so that the cart 104 maintains a predetermined distance from the transmitter 102. In the schematics that follow, that predetermined distance is approximately five to six feet. However, selecting different component values will result in a different predetermined distance without departing from the scope of the present invention.

Based on the signals from the channels 308, 310, the control circuitry 312 also generates a number of signals in addition to the motor control signals. For example, if the cart 104, turns on and the transmitter 102 is located within the predetermined distance (e.g., 5-6 feet), then an "Auto Lock Out" control signal 342 is generated so that the cart 104 does not move. If the cart 104 cannot determine that a modulated signal of acceptable strength is being received, then a Power Control signal 330 is generated to shut off power to stop the cart instead of it roaming about trying to seek a signal.

Additionally, circuitry can be included to determine when the cart 104 is moving in the reverse direction. Upon such an occurrence a Beeper signal 332 can be generated. If the cart 104 is activated but then does not move for a preset time (e.g., 10 seconds), then a Park signal 340 is generated to deactivate the cart 104. In one embodiment, power must then be turned on and off to re-active the cart 104. Also, a Safe Start signal 338 is generated that controls the activation of the cart 104. If the cart 104 is activated and the signals from the receiver would result in movement of the cart more than a predetermined distance (e.g., 10 feet) then power is prevented from reaching the drive motors. This ensures the cart does not start and immediately accelerate. One additional safety feature is a signal 334 to the electrical brakes of the cart 104. If the RF signal is lost, then the signal 334 is applied to the brakes so that the cart 104 will quickly come to a halt.

In addition to the received signals being used to generate control signals for the cart 104, the operation of the electric motors are monitored as well. For example, when a motor turns off and the cart is coasting, the voltage generated by the motor is sensed and generates a reverse signal to create a braking action on the motor. Also, the current which a motor draws can be sensed to determine if more torque is needed by that motor or if the current draw for the motor is too large over a predetermined time period, then the power to the motors can be deactivated.

The exemplary cart described herein may be exposed to the environment to varying degrees. Accordingly, in an exemplary embodiment, the connections between the RF antenna and receivers 306 and the control circuitry 312 are accomplished with quick-connect/disconnect, keyed connectors that are easy to use and prevent miscoupling of equipment. Furthermore, the drive motors are sealed units that resist intrusion of dust and moisture.

One advantageous feature of certain embodiments of the present invention includes a battery charger on the cart 104 for the transmitter 102. Not only are the batteries in the cart 104 rechargeable, but the cart 104 includes a smart charger for the transmitter 102. A smart charger is one that fully charges a battery and then drops to a "maintenance" state that prevents overcharging the battery. The transmitter 102, for example, can be powered by two 3.6 VDC NiMH wireless telephone batteries and the cart 104 can be powered by two 12 VDC deep cycle batteries.

Figure 4:
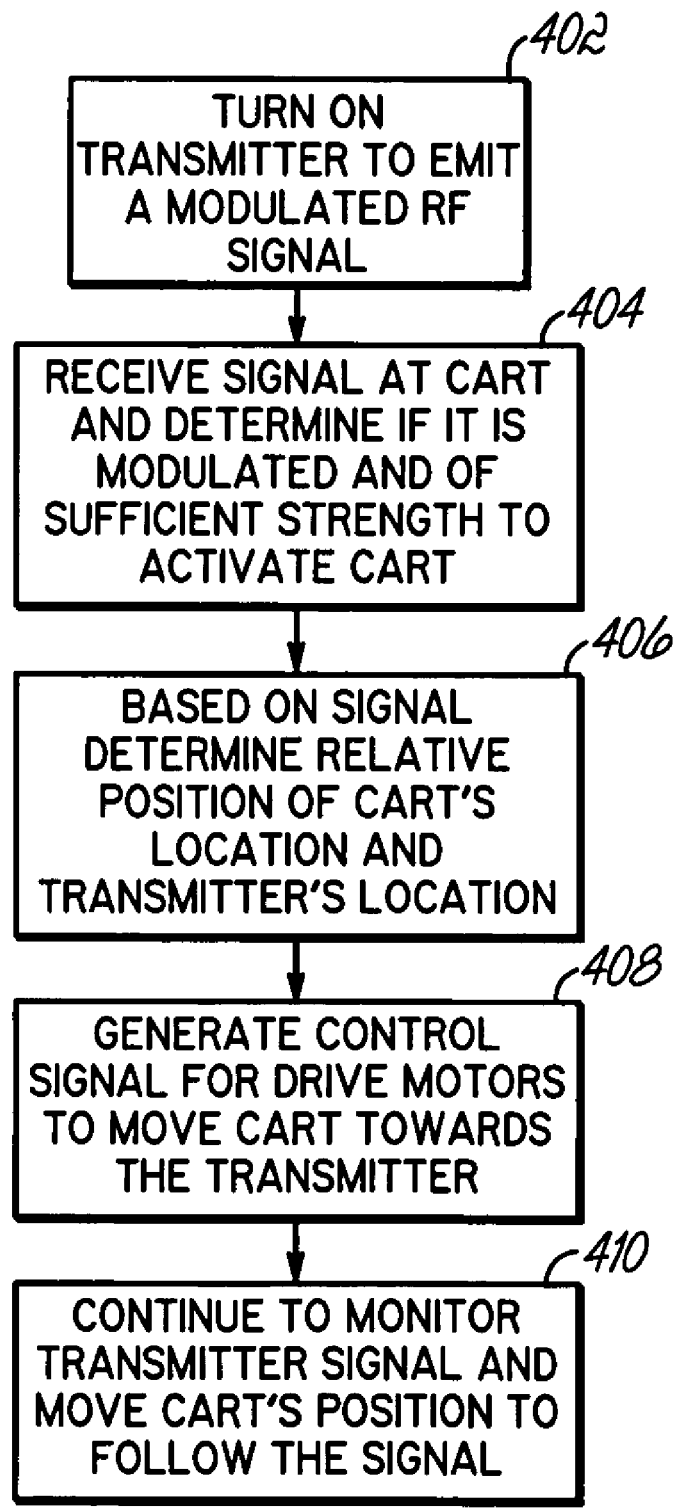
FIG. 4 depicts an exemplary method of controlling a golf cart in accordance with principles of the present invention.

FIG. 4 depicts an exemplary method of controlling a golf cart in accordance with principles of the present invention. In step 402, a transmitter is turned on that provides a modulated RF signal. In step 404, receiver of a cart receives a signal and determines if it is modulated and of sufficient strength to power on. If the cart powers on, then, in step 406, the received signal is processed so as to determine the cart's relative position to the transmitter. By relative position, it is meant that the forward/back and the left/right relationship between the cart and the transmitter is determined. In step 408, a control signal is generated for electrical drive motors so as to cause the cart to move towards the transmitter. The cart monitors the received signal, in step 410 and automatically adjusts its position relative to the transmitter as the transmitter moves. In a particular embodiment of the present invention, separate drive signals are generated for two drive motors, one on the left side of the cart and one on the right side of the cart.

With respect to the schematics of a particular implementation of a number of the features of this invention, one of ordinary skill will readily recognize their operation and functionality from this disclosure. However, a brief description of the schematics is provided below to highlight particular features or to more fully explain the behavior of some of the circuitry.

An exemplary transmitter that emits a modulated RF signal may be utilized in this invention. The battery may, for example, be a 12V battery operationally coupled to charging circuitry for a cart in accordance with the principles of the present invention. A left and right antenna in accordance with the principles of this invention may embody two tuned antennas that are located approximately two feet apart. The antennas have two separate secondary windings that are connected in series with its counterpart on the other side. In one case the windings are in phase so that the received signal is added together, and in the other case the windings are connected 180 degrees out of phase so that the signals subtract. When the transmitter is positioned such that the signals received at each antenna are relatively equal, one set of windings will have twice the signal amplitude, while the other will be near zero. These two signals are connected to a tuned radio receiver with dual matched channels.

A receiver in accordance with the principles of this invention may consist of two similar RF amplifier channels, a demodulator, an Automatic Gain Control (AGC) circuit, and RF On circuit, and circuitry to develop right and left motor speed and direction signals. The SUM signal is amplified in a typical AGC circuit and the AGC voltage is utilized to activate the cart control circuitry. The AGC voltage is also combined with the left/right signal to control the speed of each motor separately and is utilized to synchronize an electronic switch that samples the DIFF signal. The DIFF signal is also amplified based on the AGC voltage and is sampled at its carrier rate in phase with the SUM signal. This results in a positive or negative DC voltage being developed in response to an imbalance between the two signal received at the different antennas. This positive or negative DC voltage is amplified and results in a left/right DC signal. The left/right signal and the AGC voltage are combined together to provide separate speed signals for the right and left drive motors. In particular, the drive signals are referenced to a 2.5 VDC level. If above the reference level, then the motor drives in one direction proportional to the amount above 2.5 VDC and in the opposite direction proportional to the amount below 2.5 VDC.

Circuitry for controlling a motorized cart in accordance with the principles of this invention senses the two motor speed control signals (and an RF On signal) to control power relays that connect the batteries to a pulse modulated speed control signal. Dual voltage comparators are used for each side to generate pulsed waveforms whose pulse widths are proportional to the amplitude of the motor speed signal. One comparator controls the forward signal and the other comparator controls the reverse signal. Thus, there are four digital outputs used to control forward and reverse FET drivers for the two motors. Power control circuitry controls the speed of the two drive motors by controlling the flow of DC current from the storage batteries to the motors in response to the four digital signals from the control circuitry. One advantageous result from the design of this aspect of the invention is that based on the circuit design when the cart is running forward, one motor is running on +12 VDC and the other on −12 VDC so as to draw power from both batteries at approximately the same rate.

With respect to power control circuitry, four 70-amp power relays are used to switch the battery power to a number of power transistors. These relays switch off the battery power under certain conditions, such as, for example, loss of the RF signal. There are twelve power field effect transistors connected in a "H" bridge pattern between the two storage batteries and the motors. (There are four banks with three parallel transistors). A pair of banks work together to switch +12 VDC or −12 VDC battery voltages to a motor. More particularly, the transistors turn on and off in response to digital signals from the control circuitry.

While this invention has been illustrated by a description of various preferred embodiments and while these embodiments has been described in some detail, it is not the intention of the inventor to restrict or in any way limit the scope of the appended claims to such detail. Additional advantages and modifications will readily appear to those skilled in the art. The various features of the invention may be used alone or in numerous combinations depending on the needs and preferences of the user.

For example, a transmitter may be attached to a first cart so that a second cart follows the first cart while the first cart follows a person. Thus, the carts can be daisy-chained together. This has been a description of the present invention, along with the preferred methods of practicing the present invention as currently known.

What is claimed is:

1. A motorized cart controlled by a radio frequency signal comprising:
    a receiver configured to detect a signal emitted from a transmitter;
    a signal processor, in communication with the receiver, configured to determine a relative position of the transmitter based on a phase difference between the signal received on a first antenna and the signal received on a second antenna, and to generate first and second drive control signals from the signals received on the first and second antennas; and
    motor control circuitry, in communication with the signal processor, configured to drive a first drive motor based on the first drive control signal and drive a second drive motor based on the second drive control signal so as to move a location of the motorized cart,
    wherein the motorized cart maintains a predetermined distance from the transmitter, and
    further wherein the first and second drive control signals prevent the first and second drive motors from moving the cart when the cart is within a predetermined distance from the transmitter.

2. The motorized cart of claim 1, further comprising:
    an assembly for holding golf-related items.

3. The motorized cart of claim 1, wherein the relative position includes a right/left value and a back/forwards value.

4. The motorized cart of claim 1, wherein the receiver includes a right antenna and a right channel, and a left antenna and a left channel.

5. A method of controlling a driverless, motorized cart, comprising the steps of:
    receiving a radio-frequency signal at the cart on a first antenna and a second antenna from a transmitter;
    determining a location of the transmitter from the received radio-frequency signal;
    calculating a left/right direction of the cart in relation to the transmitter from a phase difference between the radio-frequency signal received on a first antenna and the radio-frequency signal received on a second antenna;
    calculating a distance between the location of the transmitter and a location of the cart from an amplitude of the received radio-frequency signal on the first and second antennas;
    comparing the distance to a predetermined value;
    in response to the distance being greater than the predetermined value, generating first and second drive control signals from the distance and left/right direction that respectively and independently control a first and a second drive motor causing movement of the cart toward the transmitter so as to maintain a predetermined distance from the transmitter; and
    in response to the distance being within the predetermined value, generating first and second drive control signals that prevent the first and second drive motors from moving the cart.

6. The method of claim 5, further comprising the steps of:
    monitoring respective current draw from the first drive motor and the second drive motor; and
    adjusting torque of the first and second drive motors in response to the monitored current draw.

7. The method of claim 5, further comprising the step of:
    upon detecting a signal strength of the radio-frequency signal from the transmitter below a predetermined threshold, disabling the motorized cart.

8. The method of claim 5 wherein the radio-frequency signal is a modulated radio-frequency signal.

9. A motorized golf cart system comprising:
    a transmitter configured to emit a modulated signal;
    a receiver configured to detect the modulated signal;
    a signal processor, in communication with the receiver, configured to determine a relative position of the transmitter based on a phase difference between the modulated signal received on a first antenna and the modulated signal received on a second antenna, and generate first and second drive control signals from the modulated signals received on the first and second antennas; and
    motor control circuitry, in communication with the signal processor, configured to drive a first drive motor based on the first drive control signal and drive a second drive motor based on the second drive control signal so as to move a location of the motorized cart,
    wherein the motorized cart maintains a predetermined distance from the transmitter, and further wherein the first and second drive control signals prevent the first and second drive motors from moving when the cart is within a predetermined distance of the transmitter.

10. The motorized golf cart system of claim 9, wherein the receiver includes a right antenna and a right channel, and a left antenna and a left channel.

11. The motorized golf cart system of claim 9, further comprising:
  a battery charge circuit coupled with a power source of the motorized golf cart; and
  a port configured to receive the transmitter and recharge a transmitter power source.

12. The motorized golf cart system of claim 9, further comprising:
  a smart battery charger configured to avoid overcharging.

13. The motorized golf cart system of claim 9 wherein the transmitter is on-board a second motorized cart.

14. The motorized golf cart system of claim 9, wherein if communication between the transmitter and the receiver is interrupted, the transmitter is configured to be powered off and reset.

15. The motorized golf cart system of claim 9, wherein the modulated signal is configured such that it does not interfere with a second, paired cart and transmitter.

16. The motorized golf cart system of claim 9, wherein if the modulated signal is not detected by the receiver, a brake of the motorized cart is automatically applied.

17. The motorized golf cart system of claim 9, wherein if the motorized cart is activated and does not move for a preset time, then the cart is configured to be deactivated.

18. A motorized cart system comprising:
  a transmitter configured to emit a modulated signal;
  a receiver including a first antenna coupled to a first side of the cart and a second antenna coupled to an opposing second side of the cart, the receiver configured to detect the modulated signal;
  a signal processor, in communication with the receiver, configured to determine a relative position of the transmitter based on a phase difference between the modulated signal received on the first antenna and the modulated signal received on the second antenna, and generate first and second drive control signals from the modulated signals received on the first and second antennas;
  motor control circuitry, in communication with the signal processor, configured to drive a first drive motor based on the first drive control signal and drive a second drive motor based on the second drive control signal so as to move a location of the motorized cart, the signal processor further configured to monitor respective current draw from the first drive motor and the second drive motor and adjust a torque of the first and second drive motors in response to the monitored current draw;
  a battery charge circuit coupled with a power source of the motorized golf cart; and
  a port of the battery charge circuit configured to receive the transmitter and recharge a transmitter power source,
  wherein the motorized cart maintains a predetermined distance from the transmitter, and
  wherein the first and second drive control signals prevent the first and second drive motors from moving when the cart is within a predetermined distance of the transmitter, and
  wherein the battery charge circuit switches to a maintenance state when the transmitter power source is fully recharged to avoid overcharging.

* * * * *